May 31, 1938.  F. G. HUGHES  2,118,885
ANTIFRICTION BEARING
Filed May 5, 1936

INVENTOR:
FREDERICK G. HUGHES,
BY Gales P. Moore
HIS ATTORNEY

Patented May 31, 1938

2,118,885

UNITED STATES PATENT OFFICE 2,118,885

ANTIFRICTION BEARING

Frederick G. Hughes, Bristol, Conn., assignor to General Motors Corporation, Detroit, Mich., a corporation of Delaware Application May 5, 1936, Serial No. 78,003

7 Claims. (Cl. 308—236)

This invention relates to antifriction bearings and comprises all of the features of novelty herein disclosed. An object of the invention is to provide improved means for securing a bearing race ring to a shaft or other supporting member. Another object is to provide a bearing race ring with an adapter device which is handled as a unit therewith and which will clamp the race ring to a supporting member in a reliable and efficient manner.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is an axial sectional view of the bearing.

Figure 1:
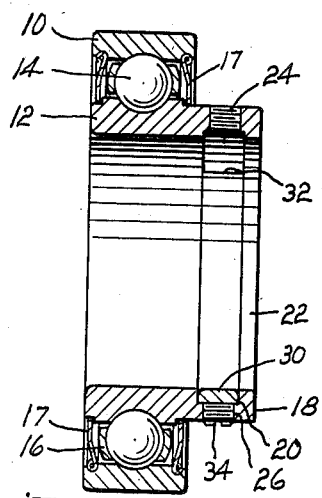

The numeral 10 indicates the outer race ring of a bearing having an inner race ring 12 and rolling elements 14. The rolling elements are herein shown as balls spaced apart by a separator 16, and the ends of the bearing may be closed in any suitable way as by shields 17. The foregoing is merely illustrative of a suitable bearing to which the invention can be applied. The inner race ring is shown provided with an extension 18 at one end, this extension being internally grooved at 20 and having a land 22 outside the groove and preferably of the same diameter as the bore of the race ring. The groove 20 is eccentric with respect to the bore of the race ring. Tapped openings 24 and 26, respectively, extend radially through the extension 20 to the shallower and to the deeper portions of the eccentric groove. At another point, preferably 90° from the openings 24 and 26, the extension has a plain radial opening 28 for a spanner.

Figure 2:
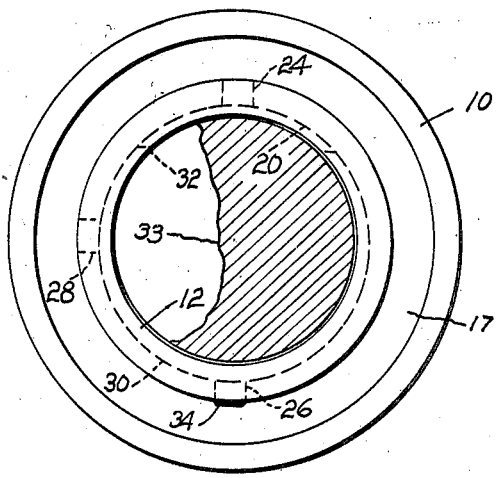
Fig. 2 is an end view of Fig. 1 ready for attachment to a supporting shaft a portion of the shaft being shown in section.
Figure 3:
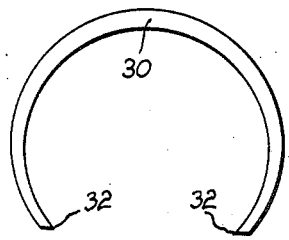
Fig. 3 is a side elevation of the eccentric wedging member.
Figure 4:
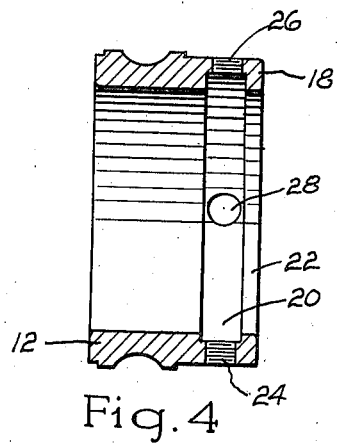
Fig. 4 is an axial sectional view of the inner race ring turned 180° from the Fig. 1 position and with the eccentric wedging member omitted.

Arranged to fit in the eccentric groove 20 is a crescent or eccentric ring-segment 30 which terminates with acute edges 32. The outer and inner arcuate surfaces of the segment are smooth and eccentric to one another and preferably extend throughout a greater angular distance than a half circle. These arcuate surfaces are connected at the ends by straight terminal edges which are acute to the inner arcuate surface at 32. With the thicker portion of the eccentric segment in the deeper portion of the eccentric groove 20, as indicated in Figs. 1 and 2, the segment tends to contract sufficiently to frictionally engage its acute edges 32 with a shaft 33 which has a slight clearance with the bore of the race ring. This contraction is not sufficient to let the segment escape from the groove when the shaft is not present because of the angular extent of the segment being 180° or more. The segment has a small radius at its internal edges to facilitate the insertion of the shaft within it. Then, by applying a spanner to the hole 28 and turning the race ring 12, one of the edges 32 of the segment will tend to bite into the shaft, the acute edges and the tendency to contract insuring sufficient friction to resist turning of the segment. This relative turning causes the eccentric surfaces to create a powerful cam or wedging action which makes the segment tightly grip the shaft and the race ring. A set-screw 34 is preferably threaded in the tapped hole 26 and forced against the segment after the latter is in wedged position to create additional bending pressure between the race ring and the shaft through the interposed segment and to further insure against relative turning of race ring and shaft. If desired, a second set-screw (not shown) may be threaded in the other tapped hole 24 to directly engage the shaft between the edges 32. The set screws may be used alternatively or conjointly and, if desired, can be projected initially into the groove to lessen its effective depth in case the shaft has considerable clearance in the bore.

I claim:

1. In an antifriction bearing, a race ring adapted for connection to a supporting member, the race ring having its bore interrupted by an internal groove which is eccentric with respect to the bore, an eccentric member in the groove and having arcuate inner and outer surfaces of greater angular extent than a half circle, one surface being of a curvature to conform to the bottom of the groove and the other surface being smooth and of a curvature to conform throughout to the supporting member, and a set-screw threaded in the race ring and engaging the eccentric member; substantially as described.

2. In an antifriction bearing, a race ring adapted for connection to a supporting member, the race ring having its bore interrupted by an internal groove which is eccentric with respect to the bore, an eccentric ring-segment in the groove and adapted to conform to the bottom of the groove and to the supporting member for more than a half circle, and the race ring having a radial opening for a fastening device adapted to engage the supporting member between the ends of the segment; substantially as described.

3. In an antifriction bearing, a race ring adapted for connection to a supporting member, the race ring having its bore interrupted by an internal groove, an eccentric ring-segment in the groove, the race ring having a pair of threaded openings leading to said internal groove, and a set screw adapted for engagement with either of said openings; substantially as described.

4. In an antifriction bearing, a race ring adapted for connection to a concentric supporting shaft, the race ring having an extension whose bore is interrupted by a groove, the bottom of the groove being eccentric to said bore, a crescent-like wedging member shaped to fit the groove and comprising inner and outer arcuate surfaces eccentric to one another, the inner arcuate surface being adapted to fit around the shaft for more than a half circle and having inherent tendency to contract against the shaft, the outer arcuate surfaces being adapted to fit the bottom of the groove and having an angular extent greater than a half circle to retain the segment in the groove when the latter contracts in the absence of the shaft; substantially as described.

5. In an antifriction bearing, a race ring adapted for connection to a concentric supporting shaft, the race ring having its bore interrupted by a groove, the bottom of the groove being eccentric to said bore, an arcuate wedging member adapted to be sprung wholly into the deepest portion of the groove to provide for easy endwise insertion of a shaft into the bore of the race ring, the wedging member being internally arcuate to fit the shaft and extending through an angular distance of at least 180° to retain itself in the groove, and the wedging member having inherent tendency to contract to urge its internal terminal portions into frictional engagement with the shaft; substantially as described.

6. In a device of the character described, a ring adapted for connection to a concentric supporting member inserted in its bore, the bore being interrupted near one end by a peripheral groove, the groove having its bottom wall eccentric to the bore, an arcuate wedging member adapted to be expanded wholly within the groove by insertion of the supporting member into said bore, the wedging member terminating in acute edges and having inherent tendency to contract to urge such edges into frictional contact with the supporting member, the wedging member having an angular extent of at least 180° and its tendency to contract being limited to prevent its falling out of the groove in the absence of the supporting member; substantially as described.

7. In a device of the character described, a ring adapted for connection to a concentric shaft inserted in its bore, the bore being interrupted by a peripheral groove, an eccentric ring segment in the groove and extending more than half way around it, the ring having a threaded opening extending radially from its outer surface to intersect the groove, and a screw threaded in the opening and adapted to engage the outer surface of the eccentric ring segment; substantially as described.

FREDERICK G. HUGHES.